Nov. 22, 1960　　　P. A. WHISLER ET AL　　　2,961,273
SPOUT CONTROL FOR FORAGE HARVESTER

Filed June 3, 1959　　　　　　　　　　　　　　4 Sheets-Sheet 1

Inventors
Paul A. Whisler
William C. McDermott
By Robert W. Lahtinen
Attorney

Nov. 22, 1960 P. A. WHISLER ET AL 2,961,273
SPOUT CONTROL FOR FORAGE HARVESTER
Filed June 3, 1959 4 Sheets-Sheet 2
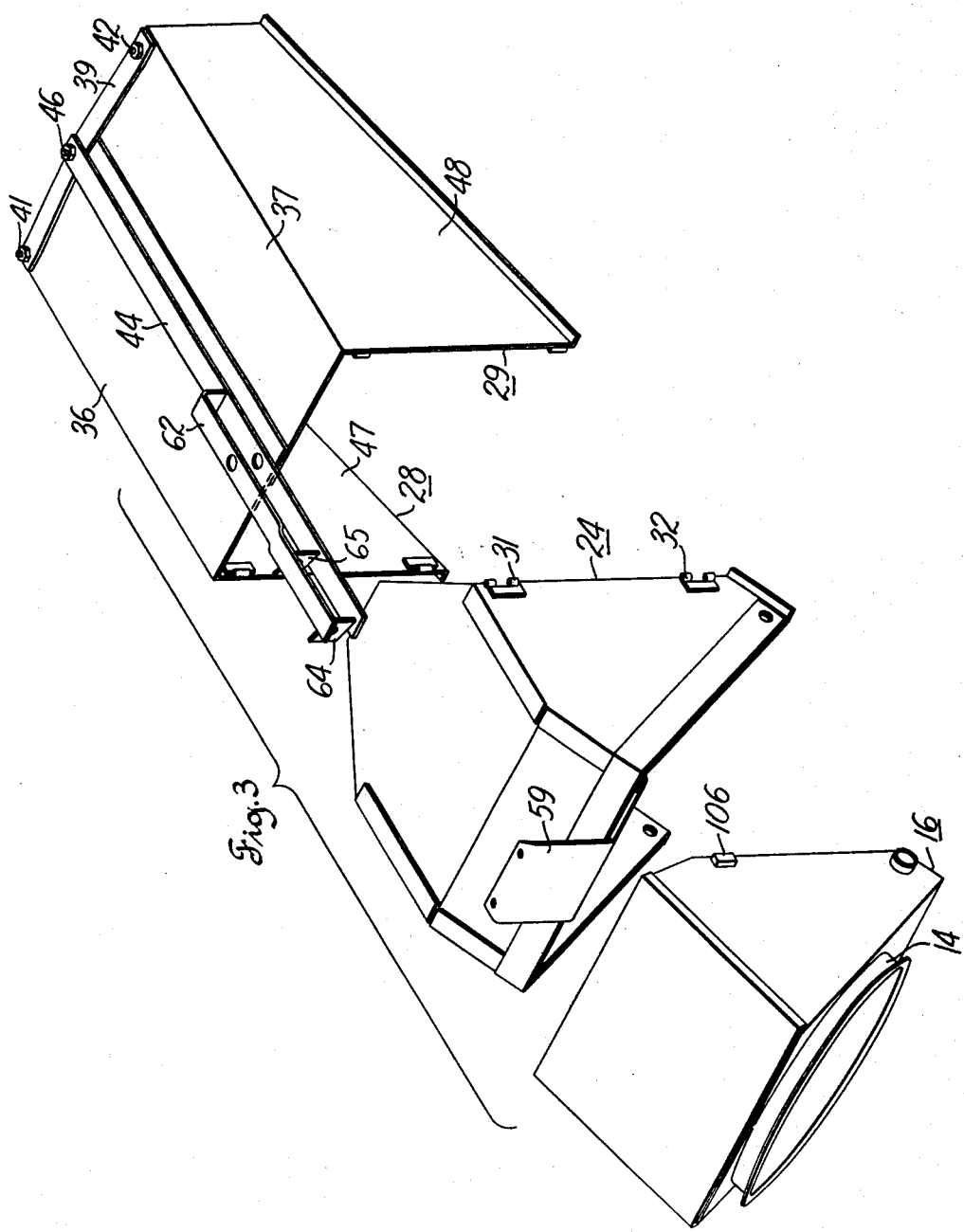
Inventors
Paul A. Whisler
William C. McDermott
by Robert W. Littleturn
Attorney

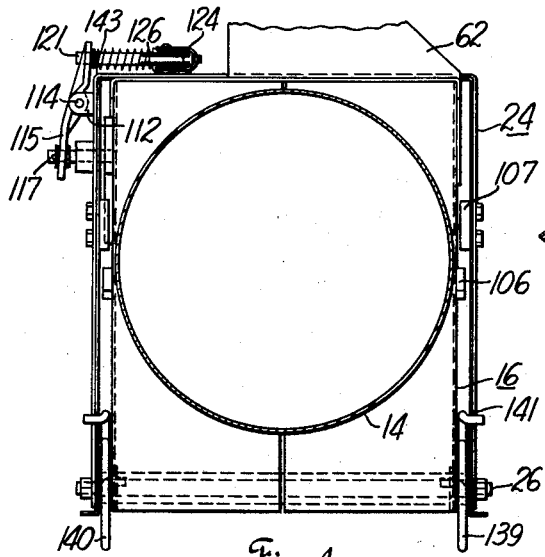
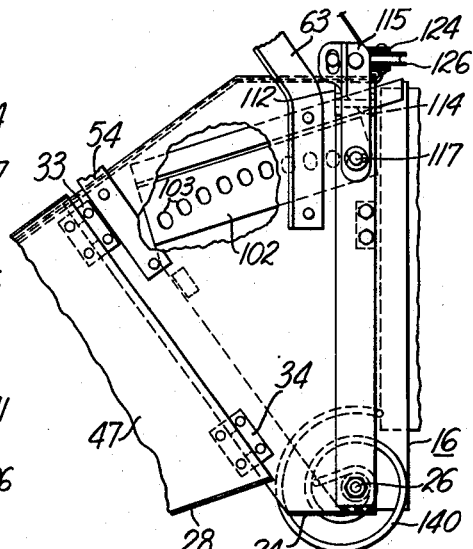
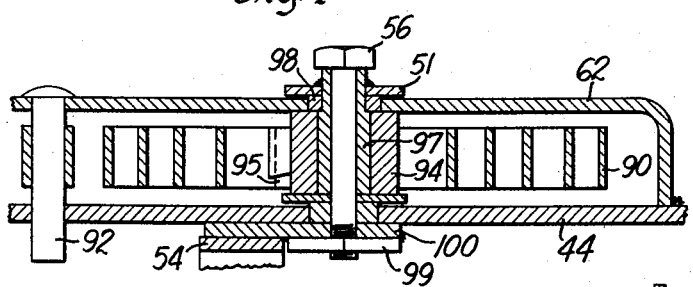
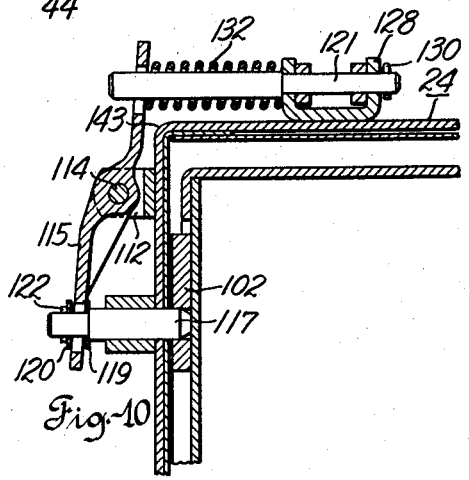
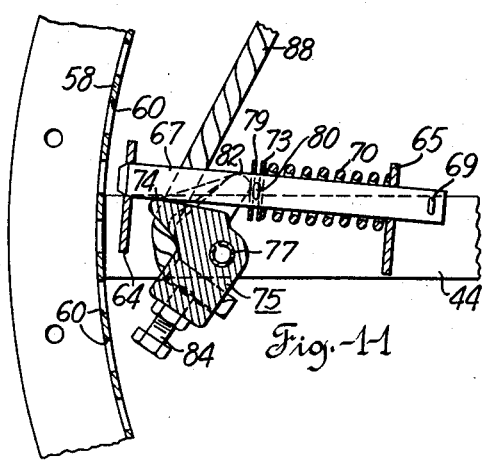

United States Patent Office 2,961,273
Patented Nov. 22, 1960

2,961,273
SPOUT CONTROL FOR FORAGE HARVESTER

Paul A. Whisler and William C. McDermott, La Porte, Ind., assignors to Allis-Chalmers Manufacturing Company, Milwaukee, Wis.

Filed June 3, 1959, Ser. No. 817,870

17 Claims. (Cl. 302—34)

This invention relates to deflector mechanisms for distributing material being discharged from a chute or conduit and more particularly to an adjustable deflector mechanism such as is used with an agricultural forage harvester to deliver the harvested material into an accompanying storage vehicle.

As is the case with numerous types of machinery, the operation of an agricultural forage harvester makes many demands upon the operator. He must control the forward motion of the tractor, the cutting height of the forage harvester unit and also keep the discharged chopped material aimed into the storage vehicle on turns as well as the straightaway. Moreover, the aim of the discharged material may have to be changed from time to time in order to load the wagon uniformly.

It is, therefore, an object of this invention to provide an improved, adjustable deflector mechanism which will take care of the mentioned requirements in a practical and fully satisfactory manner.

More specifically, it is an object of the invention to provide a universally adjustable deflector mechanism having completely independent vertical and horizontal control systems affording a complete range of side deflection in any vertical position and vice versa.

It is a further object of this invention to provide single controls for positioning and locking the deflector unit in various selected positions of vertical and horizontal adjustment.

It is a further object of this invention to provide an improved deflector of the above mentioned character having a cross section of rectangular configuration to stop the spiraling action of material as it is discharged from the standard round delivery chute section.

It is a further object of this invention to provide an improved deflector of the above mentioned character which will be operable to guide a stream of pneumatically conveyed, comminuted material from one direction into another with a minimum of turbulence and loss of velocity.

A still further object of the invention is to provide an improved adjustable deflector of the mentioned character which will be simple and compact in construction, efficient in operation and which may be manufactured at relatively low cost.

Referring to the drawings:

Fig. 3 shows an exploded view of the three principal deflecting portions of the deflector mechanism;

Fig. 4 is a cross section of the deflector taken along line IV—IV of Fig. 2;

Fig. 5 is a partial side elevation of the side opposite that shown in Fig. 2 with portions broken away;

Fig. 6 is a cross section taken along line VI—VI of Fig. 1 showing the deflector spring;

Fig. 10 is a partial section view of the deflector taken at line X—X of Fig. 2; and Fig. 11 is a partial section view taken along line XI—XI of Fig. 2.

Figure 1:
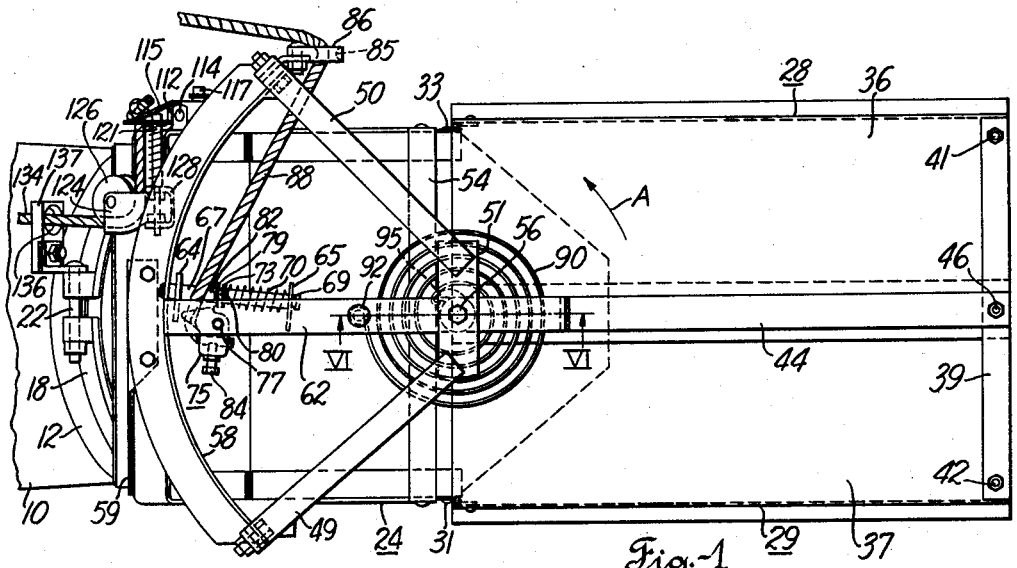
Fig. 1 is a plan view of a deflector mechanism embodying this invention wherein a portion of the concealed parts are shown in phantom view.
Figure 2:
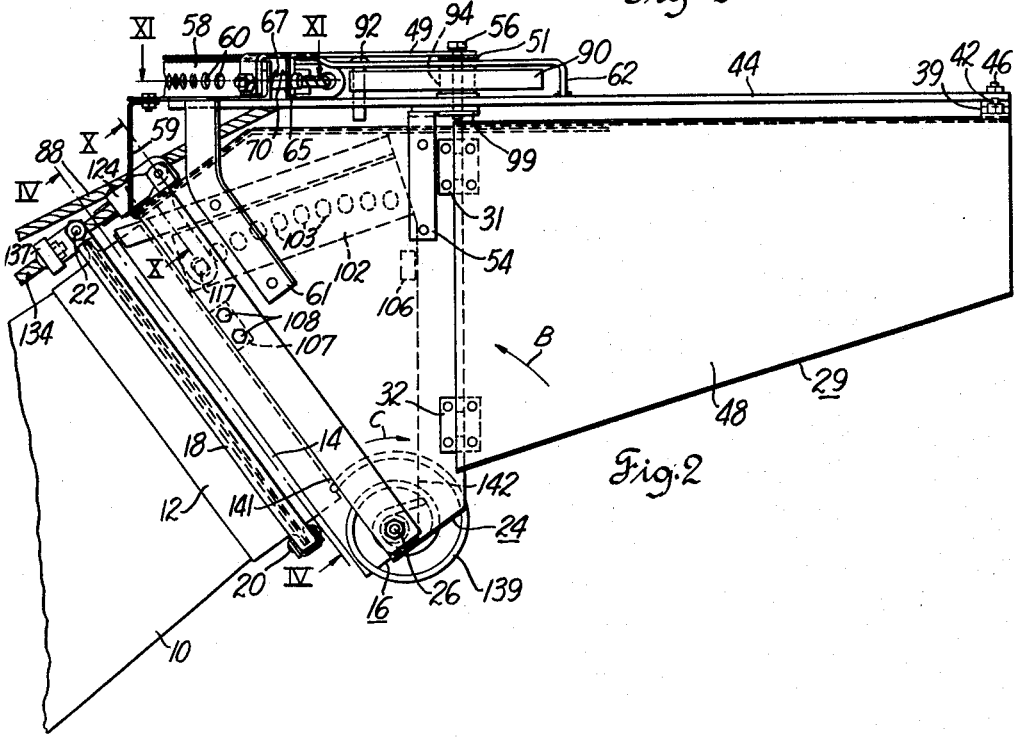
Fig. 2 shows a side elevation of the deflector unit wherein a portion of the concealed parts are shown in phantom view.

Referring to Figs. 1 and 2, a spout ring 12 is mounted on the end of the delivery spout 10. Abutting against the spout ring 12 is a flanged portion of the flanged base ring 14 which is secured as by welding to the conversion section 16 of the deflector mechanism. The spout ring 12 and the flanged base ring 14 are held in abutting relation by the spout clamp ring 18 which is formed of two semicircular sections which are pivoted about a pair of pins 20 and are held firmly in position by the clamping bolt 22. Pivotally mounted on the conversion section 16 is an intermediate section 24. This pivotal connection is established around the axis of the deflector pivot shaft 26.

Pivotally connected to the intermediate portion are a pair of terminal deflector members 28 and 29. These terminal members 28 and 29 are hingedly connected to the intermediate section 24 about a pair of axes, the axis about which member 29 is pivoted being the axis established by the pins of hinges 31 and 32. A similar pair of hinges 33 and 34 (of which only the upper hinge 33 is shown in Fig. 1) on the opposite side of the deflector unit, as shown in Fig. 5, serve to pivotally connect the other deflector member 28 to the intermediate section 24. These terminal deflecting members 28 and 29 each respectively has vertical wall portions 47 and 48 (Fig. 3) extending from their respective pivot axes which are parallel to one another and each has an inwardly extending wall portion, 36 and 37, respectively, which are in overlapping relation at their lateral extremities. These inwardly extending portions cooperate to form a third deflecting surface.

Interconnecting the ends of the deflector members 28 and 29 is a cross link 39 which pivotally connects to the deflector members respectively by means of the pins 41 and 42. Pivotally connected to the cross link 39 by means of a bolt 46 is a control bar 44. This control bar is mounted on the intermediate section 24 about a pivot pin 56 between the quadrant securing structure formed by spring loading arms 49 and 50 and the spring loading arm support 51 which are in turn welded together and the plate 100 (Fig. 6) welded to the deflector control support 54, the turned ends of which are fastened directly to the intermediate section 24. A deflector control quadrant 58 is mounted on the intermediate section 24 by brackets 61, 59 and 63 (the latter bracket being shown in part in Fig. 5). In a vertical portion of the quadrant member 58 there are a series of holes 60. The complementary or cooperating locking members are formed by the lands intervening between the quadrant holes 60 which coact with the biased holding element 67, hereinafter described, to retain the terminal deflecting members 28 and 29 in a predetermined position relative to the intermediate or material guiding duct section 24.

At one end of the deflector control arm 44 a bracket 62 is secured at one of its ends by a weld and extends along and above the control arm at a spaced distance. Disposed between the control arm 44 and the bracket 62 are two vertical cross members 64 and 65 (Fig. 1) containing openings which serve as guides for the holding element 67. A cotter pin 69 extends through an opening in the holding element 67 and serves to limit the amount of travel that the holding element 67 may have radially outward of the quadrant 58. The holding element 67 is biased toward the quadrant 58 by means of a spring 70 which bears on a washer 73 which in turn is secured against further travel along the holding element 67 by a cotter pin 80 which passes through the holding element.

A deflector actuating element or deflector release pivot 75 is pivotally connected between the control arm 44 and the bracket 62 by means of a roll pin 77. A protruding portion 82 of the pivot 75 bears against the washer 79 which in turn bears on the cotter pin 80 to move the holding element 67 against the biasing spring 70 away from the quadrant 58 thereby withdrawing the lock pin 67 from the quadrant hole. The clockwise travel of the deflector release pivot 75 is limited by contact between the lock pin 67 and a portion of the pivot 75 at 74 (Fig. 11) which underlies the protrusion 82. The cap screw 84 secures an upper deflector control cord 88 to the pivot 75. The control cord 88 passes through an eye or guide 85 in the bracket 86 which is secured to the quadrant 58 and extends to a remote operating point.

A flat coil deflector spring 90, which is also shown in cross section in Fig. 6, is connected between the deflector control arm 44 and the intermediate section 24 to urge the terminal deflecting members in a counterclockwise pivotal direction as indicated by arrow A in Fig. 1. The peripheral end of the spring is connected to an anchor pin 92 which is in turn mounted through the bracket 62 and the deflector control arm 44. The interior end of the deflector spring is connected to an arm 95 of the sleeve 94 (Fig. 6) which is assembled about the bushing 97. The bushing is square on the outside and the sleeve 94 has a corresponding square interior opening that cooperates with the exterior configuration of the bushing 97 to prevent rotation. An upper pivot spacer 98 allows the square bushing 97 to be assembled through an enlarged round opening in the bracket 62. The bushing 97 is also welded to the spring loading arm support 51. The threaded end of the pivot pin 56 engages the threads of the weld nut 99 which is in turn welded to the plate 100.

Mounted on the conversion section 16 is a quadrant plate 102 having a series of openings 103 equidistant from the pivot point established by the shaft 26. Welded on the conversion section 16 is a protruding stop member 106 which engages an inwardly extending stop member 107 mounted on the intermediate section 24 and secured by the cap screws 108. A corresponding pair of stop elements exists on the opposite side of the deflector mechanism.

The releasable locking mechanism that controls vertical deflection is best shown in Figs. 4 and 5. A bracket 112 mounted on the intermediate section 24 has, pivotally mounted thereon by pin 114, a locking pin actuating lever 115. The locking pin or holding element 117 engages the quadrant plate 102 at one end and is secured at the other end to the actuating lever 115. In Fig. 10, the right hand portion of the locking pin 117 has a greater diameter. The locking pin 117 is reduced in diameter from right to left as it passes through the washer 119 whereafter it passes through the actuating lever 115 and the washer 120. The pin 117 is retained in operative relation to the actuating lever 115 by the roll pin 122. A pulley housing 124 (Fig. 1) with the pulley 126 rotatably mounted therein is pivotally attached to the mounting bracket 128 by the lock arm guide pin 121. The bracket 128 is in turn welded to the intermediate section 24. The lock arm guide pin 121 has a reduced section which passes through the pulley housing 124 and the bracket 128 and is secured against withdrawal by a cotter pin 130 extending through an opening in the terminal portion of the end having a reduced diameter. The terminal portion of the lock arm guide pin 121 having the larger diameter extends through an opening in the actuating lever 115. The lever 115 is urged away from the bracket 128 by the biasing spring 132 which is helically disposed about the lock arm guide pin 121. The deflector control cord 134 is secured to the actuating lever 115 and extending from there is trained around the pulley 126 through the eye or guide 136 in the bracket 137 to a remote control location. The deflector control cord 134 provides for a counterclockwise adjustment of the intermediate section 24 in the direction of arrow B in Fig. 2 about the pivot axis established by the shaft 26 with respect to the conversion section 16. A vertical adjusting spring 139 in Fig. 2 and a corresponding spring 140 (Fig. 5) on the opposite side of the deflector mechanism serve to urge the intermediate section in the direction of arrow C in Fig. 2 about the axis of shaft 26 with respect to the conversion section 16.

The vertical adjusting springs 139 and 140 are disposed between the intermediate section 24 and the conversion section 16 about the pivot shaft 26. The exterior end portion of the spring 139 is bent outwardly and bears against the edge 141 of the intermediate section while the interior terminal portion of the spring is bent inwardly and bears on the edge 142 of the conversion section 16 at the discharge opening of the conversion section.

When controlling vertical deflection, the conversion section 16 serves as a material guiding duct section and the intermediate section 24 is a material deflecting duct section. In operation a pull on vertical control rope 134 is transmitted around pulley 126 attached to the frame of the intermediate section to the actuating lever 115. This initial force results in a lost motion as the actuating lever 115 compresses spring 132 and pulls the lock pin 117 out of engagement with the hole in the quadrant plate 102 permitting the intermediate section to rotate about the pivot shaft 26. When the lock pin 117 is disengaged from the quadrant plate 102, the actuating lever 115 strikes the frame of the intermediate section at 143 stopping further movement of pin 117, terminating the lost motion and transforming the pull exerted on the control cord 134 into a force tending to rotate the intermediate section 24 in a counterclockwise direction as viewed in Fig. 2. If the control rope 134 is pulled or played out slowly, lock pin 117 will remain disengaged permitting the raising or lowering of the intermediate section to the desired position. If rope tension is released suddenly, however, spring 132 will force lock pin 117 into the next quadrant hole that comes into registry with the lock pin thereby locking the intermediate section 24 in that position relative to the conversion section 16.

Horizontal deflection is provided by the terminal deflecting members 28 and 29. When control of horizontal material deflection is considered, the intermediate section 24 serves as the material guiding duct section and the terminal deflector members 28 and 29 become the material deflecting duct section. These deflecting members are individually, pivotally attached to the intermediate section 24 by the hinges 31, 32, 33 and 34 and are interconnected at their outer ends by the cross link 39. One end of the control bar 44 is attached by bolt 46 to the cross link 39. The control bar 44 is pivoted about pivot pin 56 which is, as hereinabove described, mounted on the intermediate section 24. In operation, a pull on the deflector control cord 88 is transmitted to the deflector release pivot 75 which rotates about the roll pin 77 depressing the holding element 67 against the biasing force of the spring 70 to effect disengagement of the lock pin 67 from the hole in quadrant 58. When the holding element 67 has been withdrawn from the quadrant hole, as shown in Fig. 11, a lower portion 74 of the deflector release pivot 75 comes into contact with the lock pin 67 preventing further pivotal movement of the deflector release pivot 75. Following the operation of this lost motion connection, any further tension applied to the deflector control cord 88 exerts a force on the control bar 44 in a direction opposite that shown by the arrow A (Fig. 1) overcoming the biasing force of the deflector spring 90 and pivoting the control bar 44 in a direction opposite that indicated by the arrow A. As the control arm rotates, the interconnected cross link 39 and terminal deflecting members 28 and 29 are correspondingly pivoted. If the deflector control cord 88 is played out or pulled in slowly, the lock pin 67 will remain disengaged from the quadrant hole and permit positioning of the control arm 44 and outer deflector members 28 and 29 at any selected position. If the deflector control cord 88 is released suddenly, spring 70 forces lock pin 67 into the next quadrant hole 60 which comes into alignment with the lock pin 67, thereby locking the control arm 44 and terminal deflecting members 28 and 29 in fixed position with respect to one another.

Figure 7:
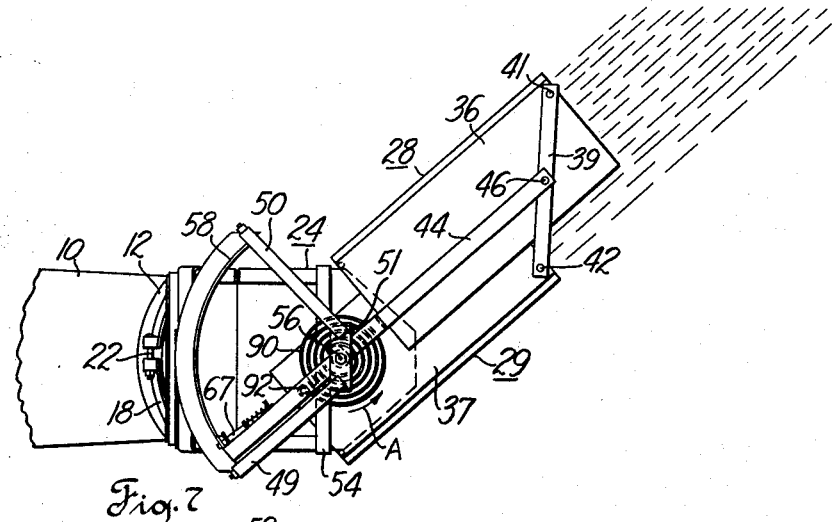
Fig. 7 is a partial plan view of the deflector mechanism shown in a position of maximum side deflection.

Fig. 7 shows the terminal deflecting members 28 and 29 in a position of maximum counterclockwise rotation. This condition would occur when the rope deflector control cord 88 has been tensioned sufficiently to release the locking pin 67 and the cord tension is then relaxed slightly so that the cord will be played out and permit the deflector spring 90 to carry the control arm 44 to the position of maximum deflection.

Figure 8:
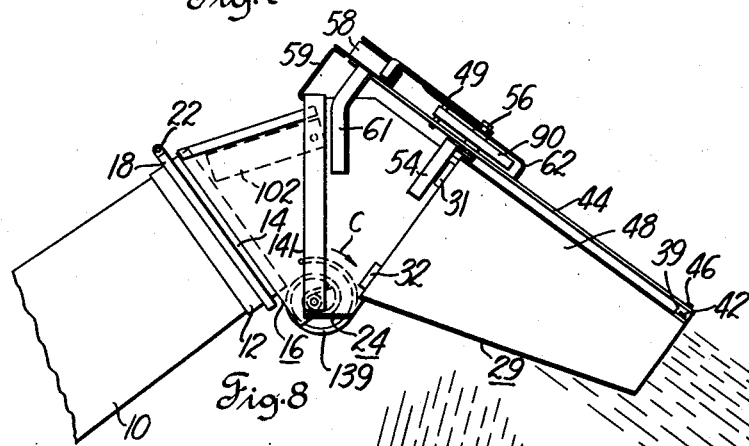
Fig. 8 is a partial side elevation of the deflector mechanism shown in a position of maximum downward deflection.

Fig. 8 similarly shows a side elevation of the deflector mechanism in the position that would be attained if the control cord 134 was tensioned to release the locking pin 117 and then played out without permitting the pin to relatch so that the deflector would be carried to a position of maximum clockwise travel as shown in Fig. 8.

Figure 9:
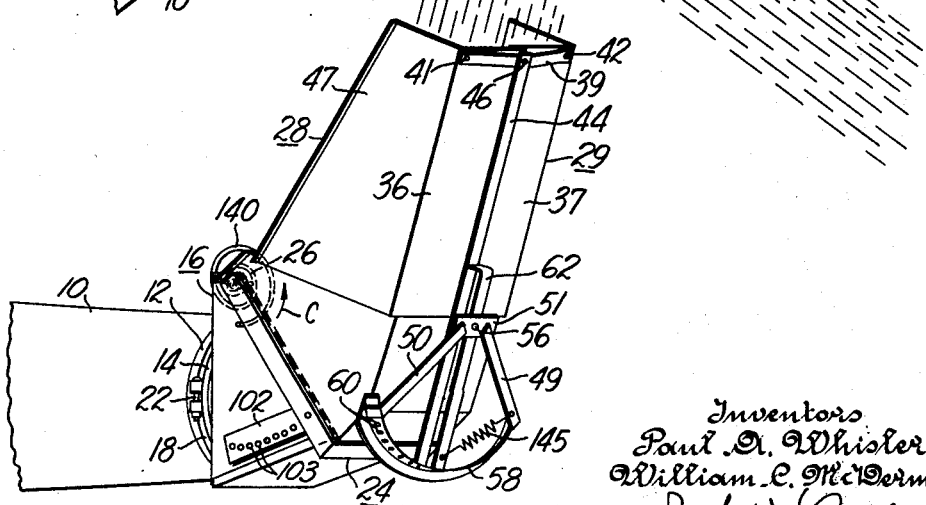
Fig. 9 is a fragmentary plan view of the deflector mechanism with the entire unit rotated ninety degrees from its normal position on the end of the delivery conduit.

Fig. 9 shows a plan view of the deflector mechanism in a condition wherein the base ring 14 has been rotated 90 degrees about the axis of ring 12 from the position in which it is shown in Figs. 1 and 2. The deflector operates similarly in this position to its operation in the normal position shown in the previous figures with the exception that because of the action of gravity upon outer deflector members 28 and 29 in this position it is necessary to install the spring 145, as shown in Fig. 9, in tension between the spring loading arm 49 and the bracket 62 to provide additional biasing force.

The vertical and horizontal control systems are completely independent from one another. Complete control of horizontal deflection is afforded the operator by use of the control cord 88. This single control sequentially disengages the lock pin 67 upon the initial application of a pull on the control cord 88; thereafter enables the horizontal or terminal deflector members 28 and 29 to be pivoted in one direction by the biasing action of the deflector spring 90 or in the opposite direction by manual pull overcoming the force exerted by the deflector spring; and finally locks the deflector members in the selected position by an abrupt release of the tension on the control cord allowing the spring 70 to force the lock pin into the first hole in the quadrant 58 to come into alignment with the lock pin.

The independent vertical control operates in a similar manner to control the pivotal relationship between the conversion section 16 and the intermediate section 24 about the axis of the deflector pivot shaft 26. Tension on the control cord 134 forces the lock pin lever 115 against the biasing spring 132 to withdraw the lock pin 117 from the hole in the quadrant plate 102 whereupon the force exerted thereafter positions the intermediate section pivotally about shaft 26 and a final quick release of tension on the cord causes the biasing action of spring 132 to force the lock pin into the first quadrant hole that aligns itself with the lock pin.

The intermediate section 24 of the deflector mechanism is pivotally connected to the conversion section 16 at the bottom reducing overall unit length and providing smooth deflection of the conveyed material. The terminal deflector members 28 and 29 are hingedly connected to the intermediate section to afford deflection with a minimum of resistance between the parallel confining walls.

The unit is rectangular in cross section to straighten out the spiraling action of the material that occurs as it travels through the round delivery spout 10.

While in the foregoing a preferred embodiment of the invention has been described, it should be understood that it is not intended to limit the invention to the exact forms and details therein disclosed and that the invention includes such other forms and modifications as are embraced by the scope of the appended claims.

What is claimed is:

1. In a material distributing spout: a material guiding duct section having a discharge opening of substantially rectangular cross section; a pair of angle deflecting members each having first and second wall portions; hinge means pivotally connecting said deflecting members with said duct section along opposite first and second sides, respectively, of said discharge opening and positioning said first wall portions radially of the axes of said hinge means, respectively, said second wall portions extending in overlapping relation to each other at a third side of said discharge opening; and linkage means interconnecting said deflecting members and operative to move said deflecting members in the same pivotal direction.

2. In a material delivering spout: a material guiding duct section having a rectangular discharge outlet; a pair of cooperating deflecting members forming a material deflecting duct section, said deflecting members being respectively pivotally connected at one end to said material guiding duct section on parallel axes disposed on opposite sides of said discharge outlet, said deflecting members having cooperating wall portions extending normal to said axes in overlapping relation to one another and to an upper portion of said duct section adjacent said discharge outlet forming a material deflecting surface; and linkage means for controlling the pivotal movement of said deflecting members whereby said members are caused to rotate about said axes in the same pivotal direction.

3. In a material delivering spout: a material guiding duct section having a discharge opening; a pair of deflecting members presenting parallel deflecting surfaces, said deflecting members being respectively pivotally connected to said duct section on parallel vertical axes disposed on opposite sides of said discharge opening; cooperating deflector portions respectively connected with said deflecting members and extending perpendicularly from said parallel surfaces in overlapping relation to each other and to an upper portion of said duct section to define a third deflecting surface above said discharge opening, said three deflecting surfaces being associated in continuously material confining relation with said duct section; and parallel linkage means operable to pivot said deflecting members about said axes whereby the parallel relationship of said surfaces is maintained in the various positions of angular adjustment.

4. A material delivering spout at set forth in claim 3 further comprising positioning means for selectively positioning the said deflecting members about their respective pivot axes; releasable fastening means for maintaining said deflecting members in a selected position with respect to said material guiding duct section; and single control means for actuating said positioning means and disengaging and engaging said releasable fastening means.

5. In a material delivering spout: a material guiding duct section having an inlet opening and a rectangular discharge opening; a material deflecting duct section having inlet and discharge openings and pivotally connected to said material guiding duct section in material receiving relation about a horizontal axis transverse to the path of material flow; a pair of cooperating deflecting members forming a terminal deflecting portion, each said member having first and second wall portions, said first wall portions presenting parallel deflecting surfaces pivotally connected to said material deflecting duct section about respective parallel axes disposed on opposite sides of said discharge opening with said second wall portions extending perpendicularly from said first wall portions respectively in overlapping relation with respect to one another and to a portion of said deflecting duct adjacent to said discharge opening of said deflecting duct to cooperatively define a deflecting surface; and linkage means operative to control the pivotal movement of said terminal deflecting members about said axes so that said members are caused to rotate about said axes in the same pivotal direction.

6. An adjustable deflector for mounting on the discharge end of a material conveying conduit comprising a material guiding duct section, a material deflecting duct section connected in angularly adjustable relation to said guiding duct section and biased for angular movement in a predetermined direction relative thereto; a holding element associated with one of said sections and biased to holding engagement with one of a series of complementary holding elements associated with the other of said sections; and means for adjusting the angular position of said material deflecting duct section relative to said material guiding duct section comprising an actuating element having an operating connection with said biased holding element and a lost motion operating connection with said deflecting duct section so that actuation is effected by application of an initial force to said actuating element in one direction to release said biased holding element from holding engagement with the other of said holding elements and thereby permit said deflecting duct section to move in said predetermined direction, and upon application of a force greater than said initial force upon said actuating element in the same direction as said initial force moves said deflecting duct section in a direction opposite to said predetermined direction, and said biased holding element being automatically engageable in cooperative relation with the adjacent one of said series of complementary holding elements on release of all actuating force upon said actuating element to thereby hold said material deflecting duct section in the selected angularly adjusted position relative to said material guiding duct section.

7. An adjustable deflector for selectively directing a blast of material particles from the discharge end of a conveying conduit in different directions comprising: a material guiding duct section adapted for mounting in angularly fixed relation to said conduit; a material deflecting duct section connected in overhanging, pivotally adjustable relation to said guiding duct section about an axis extending transversely of said guiding duct section; a biased holding element associated with one of said sections and biased to holding engagement with one of a series of complementary holding elements associated with the other of said sections; said biased holding element cooperating with one of said complementary holding elements to hold said material deflecting duct section in an angular adjusted position relative to said material guiding duct section; and operating means for selectively pivotally positioning said material deflecting duct section relative to said material guiding duct section about said axis including a lost motion operating connection associated with said biased holding element effective to allow said operating means to sequentially disengage said biased holding element from said complementary holding element, angularly position said material deflecting duct section with respect to said material guiding duct section, and reengage said biased holding element with said complementary holding element.

8. A deflector as set forth in claim 7 wherein said biased holding element is operatively associated with said material deflecting duct section and said complementary holding elements are mounted upon said material guiding duct section.

9. A deflector unit as set forth in claim 8 wherein said operating means comprises a single control cord actuable in cooperation with said lost motion operating connection to disengage said biased holding element through a relatively light pull applied to said control cord, thereby releasing said deflecting duct section for pivotal movement about said axis in a predetermined direction; actuable through a heavier pull applied to said cord applied in the same direction as said light pull to move said deflecting duct section in a direction opposite to said predetermined direction; and said biased holding element being automatically engageable with the adjacent one of said complementary holding elements upon release of all actuating pull.

10. A deflector as set forth in claim 7 and further comprising rotatable mounting means for adjusting said guiding duct section relative to said material conveying conduit to various rotational positions, and releasable locking means for securing said guiding duct section in different rotatively adjusted positions to said conduit.

11. A deflector as set forth in claim 10 and further comprising biasing means operative to pivotally urge said material deflecting duct section about said axis in one direction with respect to said material guiding duct section.

12. A deflector as set forth in claim 7 wherein said axis is disposed below the path of material flow through said guiding duct section.

13. An adjustable deflector for selectively directing a blast of material particles from the discharge end of a material conveying conduit in different directions comprising: a material guiding duct section adapted for mounting in angularly fixed relation to said conduit; a material deflecting duct section having a discharge outlet and connected in overhanging pivotally adjustable relation to said guiding duct section about a horizontal axis extending transversely of said guiding duct section and biased for angular movement in a predetermined direction relative thereto; a pair of cooperating terminal deflecting members, said members each having first and second wall portions perpendicular to one another with said first wall portions respectively connected to said deflecting duct section on parallel vertical axes on opposite sides of said discharge outlet with said second wall portions extending toward one another in overlapping relation to form a third deflecting surface; control means effective to cause pivotal movement of said deflecting members in the same pivotal direction; and releasable fastening means for selectively securing said deflecting duct section in a predetermined angular position with respect to said guiding duct section.

14. A deflector as set forth in claim 13 wherein said releasable fastening means comprises a holding element associated with one of said sections and biased to holding engagement with one of a series of complementary holding elements associated with the other of said sections and means for adjusting the angular position of said deflecting duct section relative to said guiding duct section comprising an actuating element operatively associated with said holding element including a lost motion operating connection, said actuating element being operative initially on application of a force thereto in one direction to disengage said holding element from said one of said complementary holding elements and being operative thereafter on continued application of force thereto in said one direction to pivot said deflecting duct section in a direction opposite said predetermined angular direction and said holding element on release of all operating force on said actuating element being automatically engageable with the adjacent one of said cooperating holding elements to thereby hold said deflecting duct section in the corresponding angular position relative to said guiding duct section.

15. A deflector as set forth in claim 14 further comprising an operating cord connected to said actuating element and so oriented that said force applied in said one direction is effected by a pull on said operating cord.

16. A deflector as set forth in claim 14 further comprising a rotatable mounting means for adjusting said guiding duct section in various rotational positions with respect to said material conveying conduit; releasable locking means for securing said deflector to said material conveying conduit in a predetermined position; and a supplemental biasing means operatively positioned to overcome the downward force due to gravity on said deflecting duct section when said deflecting duct section is oriented in a nonhorizontal position.

17. An adjustable deflector for mounting on the discharge end of a material conveying conduit comprising: a material guiding duct section; a material deflecting duct section with inlet and outlet openings connected in pivotally adjustable, material receiving relation to said guiding duct section about a first axis and biased for pivotal movement in a predetermined direction relative thereto; a first series of complementary holding elements associated with one of said sections; a first biased holding element normally engaging one of said complementary holding elements to secure said guiding duct section to said deflecting duct section; first actuating means including a lost motion connection for sequentially disengaging said biased holding element, positioning said deflecting duct section with respect to said guiding duct section and reengaging said holding element with one of said complementary holding elements; a pair of terminal deflecting members, respectively, angularly connected to said deflecting duct section about parallel axes located on diametrically opposite sides of said deflecting duct outlet, said deflecting members respectively having deflecting wall portions in substantially parallel relation to one another and inwardly extending wall portions in overlapping relation cooperable to form a third deflecting surface, said parallel axes being transverse to said first axis; linkage means operatively connected to said terminal deflector members to cause said members to move in the same pivotal direction; cooperable holding means respectively associated with said linkage means and said deflecting duct section; and second actuating means, including a lost motion connection, for sequentially disengaging said cooperable holding means, positioning said linkage means with respective to said material guiding duct section, and reengaging said cooperable holding means.

References Cited in the file of this patent

UNITED STATES PATENTS

| | | |
|---|---|---|
| 658,095 | Ries | Sept. 18, 1900 |
| 998,724 | Townsend | July 25, 1911 |
| 2,656,999 | Ullberg | Oct. 27, 1953 |